United States Patent
Fujiwara

(10) Patent No.: US 7,940,922 B2
(45) Date of Patent: May 10, 2011

(54) TELEPHONE INTERFACE CIRCUIT

(75) Inventor: Yoshinobu Fujiwara, Tokyo (JP)

(73) Assignee: Uniden Corporation, Tokyo (JP)

( * ) Notice: Subject to any disclaimer, the term of this patent is extended or adjusted under 35 U.S.C. 154(b) by 1269 days.

(21) Appl. No.: 11/481,582

(22) Filed: Jul. 6, 2006

(65) Prior Publication Data

US 2008/0037772 A1 Feb. 14, 2008

(51) Int. Cl.
*H04M 3/00* (2006.01)

(52) U.S. Cl. ..... 379/418; 379/404; 379/412; 379/413.01

(58) Field of Classification Search ................. 379/418, 379/399.01–413.04
See application file for complete search history.

(56) References Cited

U.S. PATENT DOCUMENTS

| | | |
|---|---|---|
| 4,475,012 A | 10/1984 | Coulmance |
| 4,580,011 A | 4/1986 | Glaser |
| 4,694,483 A | 9/1987 | Cheung |
| 4,709,296 A * | 11/1987 | Hung et al. ................. 361/102 |
| 5,392,349 A | 2/1995 | Elder |
| 5,796,767 A | 8/1998 | Aizawa |
| 6,418,222 B2 | 7/2002 | Wong et al. |
| 6,782,098 B1 * | 8/2004 | Fujiwara ..................... 379/412 |
| 7,027,594 B2 | 4/2006 | Casey et al. |
| 7,206,403 B2 | 4/2007 | Fujiwara |
| 2004/0228060 A1 | 11/2004 | Fujiwara |
| 2007/0025549 A1 | 2/2007 | Fujiwara |
| 2008/0037773 A1 | 2/2008 | Fujiwara |
| 2008/0181391 A1 | 7/2008 | Fujiwara |
| 2008/0285741 A1 | 11/2008 | Fujiwara |

OTHER PUBLICATIONS

Co-pending Unpublished U.S. Appl. No. 12/268,895, filed Nov. 11, 2008.

* cited by examiner

*Primary Examiner* — Md S Elahee
*Assistant Examiner* — Ibraham Sharifzada
(74) *Attorney, Agent, or Firm* — Steven J. Hulquist; Hulquist IP

(57) ABSTRACT

A telephone interface circuit comprising a speech circuit, a control circuit turning on upon receiving a supply of a forward direction trigger current so as to connect first and second telephone lines and the speech circuit, and going off upon receiving a supply of a reverse direction trigger current so as to disconnect the first and second telephone lines and the speech circuit, a capacitor charging and discharging charge supplied from the first telephone line, and a hook switch supplying charge accumulated at the capacitor when off-hook to the control circuit as a forward direction trigger current, and supplying charge discharged from the capacitor when on-hook to the control circuit as a reverse direction trigger current.

2 Claims, 2 Drawing Sheets

TELEPHONE INTERFACE CIRCUIT

BACKGROUND

The present invention relates to a telephone interface circuit, and particularly relates to improvement of complete cutting off of a telephone line at the time of an internal call.

FIG. 1 shows a circuit configuration for a telephone interface circuit 10 of the related art. The telephone interface circuit 10 controls interfacing between a speech circuit 30 and telephone lines L1, L2. The telephone interface circuit 10 is mainly comprised of a varistor element V1, diode bridge 20, hook switch 40, and transistors Q1, Q2.

The transistor Q1 is a PNP transistor, and the transistor Q2 is an NPN transistor. A resistor R1 is connected across emitter terminal E1 and base terminal B1 of transistor Q1. The emitter terminal E1 of transistor Q1 is connected to a cathode of diode D1, and collector terminal C1 is connected to the speech circuit 30. A resistor R10 is connected across the base terminal B1 of transistor Q1 and a collector terminal C2 of transistor Q2. The emitter terminal E2 of transistor Q2 branches into two, with one branch connected to the speech circuit 30 and the other branch connected to the anode of diode D4. Base terminal B2 of transistor Q2 is connected to a microcomputer (not shown) via resistor R4. The microcomputer (not shown) controls the potential of terminal HC at the time of an on-hook operation, off-hook operation, or dial pulse transmission operation etc. Further, the base terminal B2 of transistor Q2 is connected to terminal 1 of hook switch 40 via resistor R21.

Varistor element V1 absorbs overvoltages (for example, high voltages in the order of 270V or more) across the telephone lines L1, L2.

The diode bridge 20 regulates the signal flowing through the telephone lines L1, L2 for supply to the speech circuit 30. The diode bridge 20 is configured from four diodes D1 to D4.

Hook switch 40 connects terminal 1 and terminal 3 at the time of off-hook. As a result, a forward direction voltage is applied across the base terminal B2 and emitter terminal E2 of the transistor Q2 via resistor R21 and the transistor Q2 therefore turns on. As a result, the base potential of transistor Q1 rises, and the transistor Q1 also turns on. At the time of making a call, the base potential of transistor Q2 is controlled via terminal HC using control of a microcomputer (not shown) so as to correspond to a dial input. As a result, the transistor Q1 sends a dial pulse signal.

Hook switch 40 connects terminal 1 and terminal 2 at the time of on-hook. In doing so, the transistor Q1 disconnects the speech circuit 30 and the telephone lines L1, L2.

SUMMARY

It is therefore necessary for this type of telephone interface circuit 10 to supply power from the telephone lines L1, L2 to the speech circuit 30.

However, at the time of internal calls where the telephone lines L1, L2 are disconnected for use, a resistor R21 in the order of a hundreds of ohms remains between the telephone lines L1, L2 and the telephone lines L1 and L2 therefore cannot be completely disconnected.

The present invention therefore is advantageous in resolving the problem of providing a telephone interface circuit with a straightforward configuration that is capable of completely disconnecting telephone lines.

In order to resolve the aforementioned problems, a telephone interface circuit of the present invention comprises a speech circuit, a control circuit turning on upon receiving a supply of a forward direction trigger current so as to connect first and second telephone lines and the speech circuit, and going off upon receiving a supply of a reverse direction trigger current so as to disconnect the first and second telephone lines and the speech circuit, a capacitor charging and discharging charge supplied from the first telephone line, and a hook switch supplying charge accumulated at the capacitor when off-hook to the control circuit as a forward direction trigger current, and supplying charge discharged from the capacitor when on-hook to the control circuit as a reverse direction trigger current.

DETAILED DESCRIPTION

The following is a description with reference to the drawings of an embodiment of the present invention.

Figure 1:
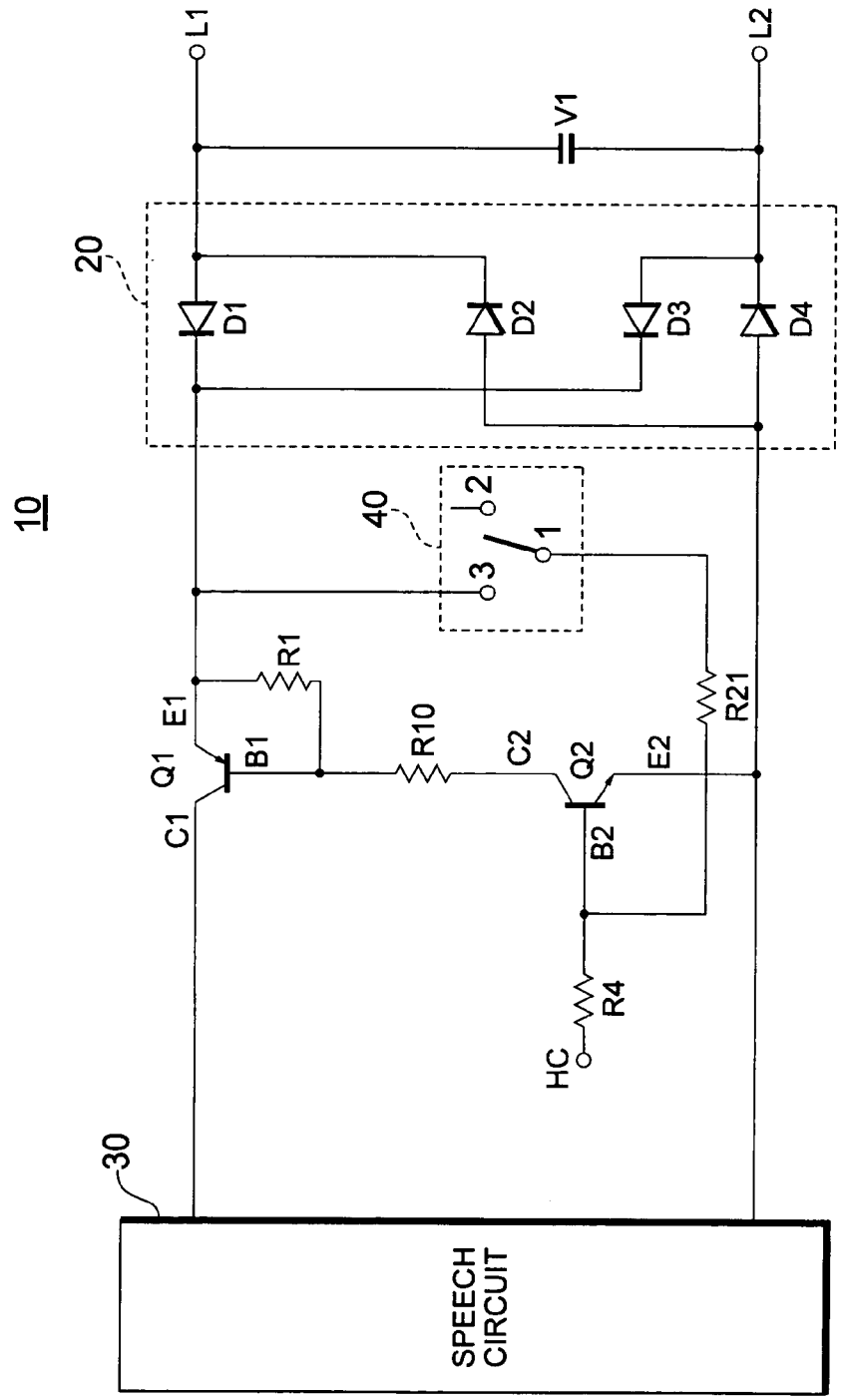
FIG. 1 shows a circuit configuration for a telephone interface circuit of the related art.
Figure 2:
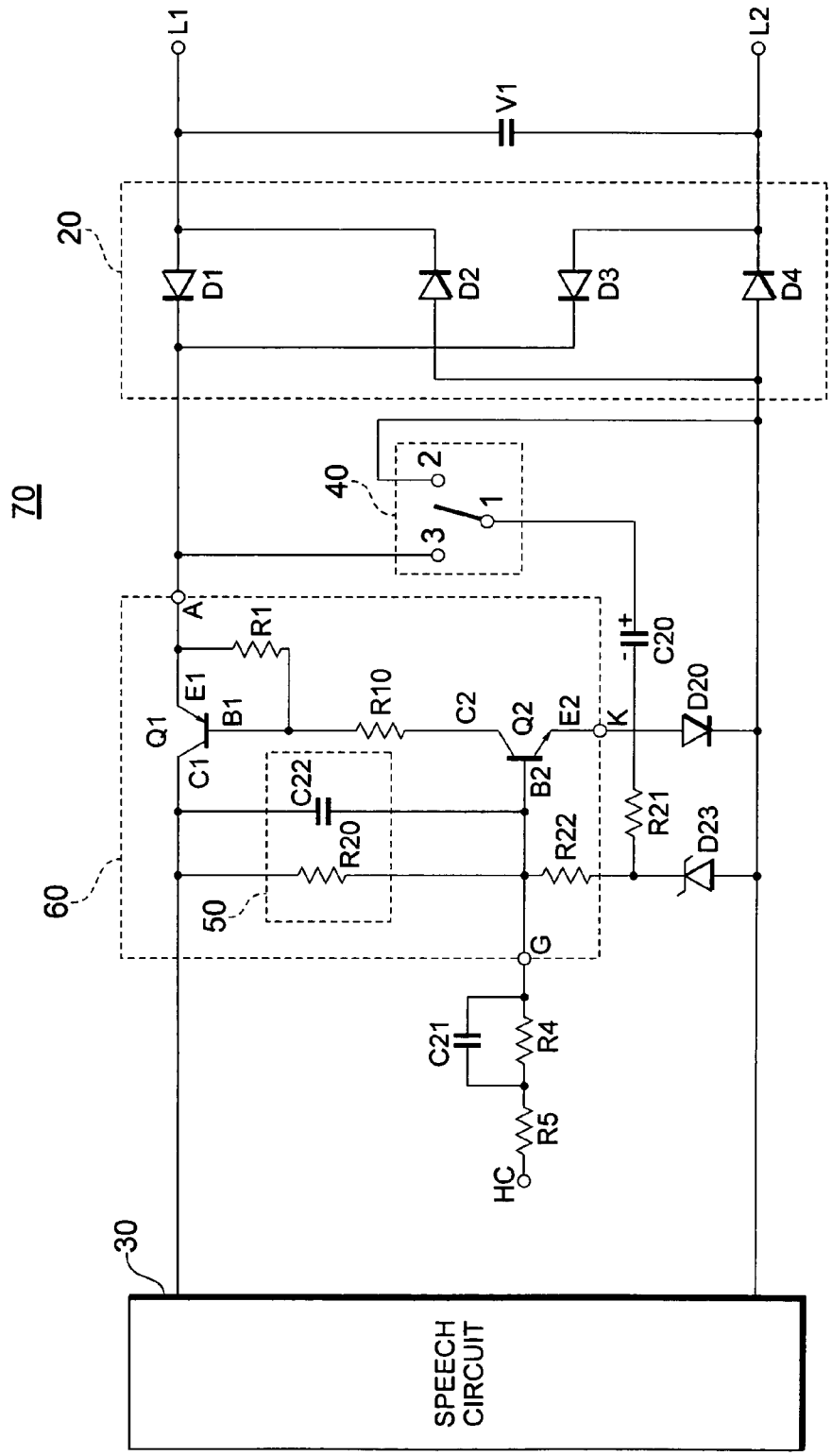
FIG. 2 shows a circuit diagram of a telephone interface circuit of this embodiment.

FIG. 2 shows a circuit diagram of a telephone interface circuit 70 of this embodiment. Elements with the same numerals as numerals shown in FIG. 1 are the same elements and detailed description thereof is therefore omitted.

A resistor R22, resistor R21 and capacitor C20 are connected in series across terminal 1 of hook switch 40 and base terminal B2 of transistor Q2. The capacitor C20 has a capacitance in the order of 0.01 μF to 1 μF. Terminal 2 of hook switch 40 is connected to earth. Terminal 3 of hook switch 40 is connected to emitter terminal E1 of the transistor Q1. The potential of terminal 2 of the hook switch 40 is taken to be earth potential.

The collector terminal C1 of the transistor Q1 branches, with one branch connected to the speech circuit 30 and the other branch being connected to the positive feedback circuit 50. The positive feedback circuit 50 has a resistor R20 and a speed-up capacitor C22 connected in parallel. The transistors Q1 and Q2 and the positive feedback circuit 50 function as a thyristor or a Schmitt trigger. Here, an example is shown of a case where the transistors Q1, Q2 and the positive feedback circuit 50 function as a thyristor 60. Namely, base terminal B2 of the transistor Q2 functions as a gate terminal G of the thyristor 60, emitter terminal E2 of the transistor Q2 functions as a cathode terminal K of the thyristor 60, and emitter terminal E1 of the transistor Q1 functions as an anode terminal A of the thyristor 60.

Base terminal B2 of the transistor Q2 branches into three, with one branch being connected to the positive feedback circuit 50, another branch being connected to earth via a Zener diode D23 (in the order of 3V), and the remaining branch being connected to a microcomputer (not shown) via an RC circuit (a circuit containing a resistor R5, a resistor R4, and a capacitor C21).

Emitter terminal E2 of the transistor Q2 is connected to earth via a level shifting diode D20.

Next, the operation of the telephone interface circuit 70 is described.

At the time of off-hook, the hook switch 40 connects terminal 1 and terminal 3. In doing so, a positive trigger voltage (transient direct current potential) is applied across base terminal B2 and emitter terminal E2 of the transistor Q2 via the capacitor C20. This positive trigger voltage (referred to as a "forward direction trigger" for convenience) acts as a forward direction voltage across the base terminal B2 and emitter terminal E2 so as to cause the transistor Q2 to go on. In doing so, the thyristor 60 that is in a forward blocking state causing the gate to go on so that a current begins to flow between the anode terminal A and the cathode terminal K. At this time, rise in the collector potential at transistor Q1 causes the base potential of the transistor Q2 to rise via the positive feedback circuit 50 and the on state of the thyristor 60 therefore continues. In particular, the positive feedback circuit 50 has a speed-up capacitor C22. This is therefore effective in causing operation so as to make the turn on time of the transistor Q2 short and the thyristor 60 stable.

At this time, as a result of control exerted by a microcomputer (not shown), even if an internal call operation takes place, the direct current resistance of the capacitor C20 is infinite in theory, and the telephone lines L1, L2 can therefore be completely disconnected.

On the other hand, at the time of on-hook, the hook switch 40 connects terminal 1 and terminal 2. In doing so, charge accumulated at the capacitor C20 flows as a trigger current (referred to as a "reverse direction trigger" for convenience) so as to cause a reverse bias across the base terminal B2 and emitter terminal E2 of the transistor Q2. In doing so, the transistor Q2 goes from being turned on to being turned off, and the thyristor 60 goes off.

Further, the Zener diode D23 is for reliably discharging charge accumulated at the capacitor C20 when on-hook. An anode of the Zener diode D23 is connected to a positive plate of the capacitor 20, and a cathode of the Zener diode D23 is connected to a negative plate of the capacitor C20 via the resistor R21.

Further, the level shifting diode D20 is made to perform an on-hook operation, off-hook operation, or dial pulse transmission operation etc. by a microcomputer (not shown) and is provided so that the transistor Q2 does not operate in an erroneous manner when the base potential of the transistor Q2 is controlled.

However, the level shifting diode D20 is not essential.

In the above description, an example of the thyristor 60 is shown as a control circuit for controlling opening and closing of connection between the telephone lines L1, L2 and the speech circuit 30 but this control circuit is not limited to being the thyristor 60. For example, application of a control circuit (for example, a Schmitt trigger) having a function for receiving supply of a forward direction trigger current, going to a turned on state, and connecting the telephone lines L1, L2 and the speech circuit on the one hand, while on the other hand, receiving supply of a reverse direction trigger current, going to a turned off state, and disconnecting the telephone lines L1, L2 and the speech circuit 30 as a control circuit for controlling the opening and closing of connection of the telephone lines L1, L2 and the speech circuit 30 is also possible.

The telephone interface circuit 70 has a configuration supplying charge accumulated in a capacitor C20 when off-hook to the thyristor 60 as a forward direction trigger current so as to cause the thyristor to go on and connect the telephone lines L1, L2 and the speech circuit 30 on the one hand, and supplying charge discharged from the capacitor C20 when off hook to the thyristor 60 as a reverse direction trigger current so as to turn off the thyristor 60 and disconnect the telephone lines L1, L2 and the speech circuit 30. It is therefore possible to make the direct current resistance of the telephone lines L1, L2 theoretically infinite when off hook, and it is possible to control the thyristor 60 to be on or off using the forward direction trigger current and the reverse direction trigger current.

What is claimed is:

1. A telephone interface circuit comprising:
   a speech circuit;
   a control circuit that turns on upon receiving a supply of a forward direction trigger current so as to connect first and second telephone lines and the speech circuit, and that goes off upon receiving a supply of a reverse direction trigger current so as to disconnect the first and second telephone lines and the speech circuit;
   a capacitor that charges and discharges charge supplied from the first telephone line; and a hook switch that supplies charge accumulated at the capacitor when off-hook to the control circuit as a forward direction trigger current, and that supplies charge discharged from the capacitor when on-hook to the control circuit as a reverse direction trigger current;
   the control circuit is a thyristor control circuit comprising a first transistor, second transistor, and positive feedback circuit;
   a base terminal of the first transistor and a collector terminal of the second transistor are connected;
   an emitter terminal of the first transistor is connected to the first telephone line;
   a collector terminal of the first transistor branches into two, with one branch being connected to the speech circuit and the other branch being connected to the positive feedback circuit;
   a base terminal of the second transistor branches into two, with one branch being connected to the positive feedback circuit and the other branch being connected to the capacitor;
   an emitter terminal of the second transistor branches into two, with one branch being connected to the speech circuit and the other branch being connected to the second telephone line; and
   the hook switch connects the capacitor and the first telephone line when off-hook, and connects the capacitor and the second telephone line when on-hook.

2. The telephone interface circuit of claim 1, the positive feedback circuit comprising a speed-up capacitor for shortening turn-on time of the second transistor.

\* \* \* \* \*